(12) United States Patent
Benkert et al.

(10) Patent No.: US 9,710,984 B2
(45) Date of Patent: Jul. 18, 2017

(54) METHOD FOR THE AUTHENTICATION OF AT LEAST ONE FIRST UNIT ON AT LEAST ONE SECOND UNIT

(71) Applicant: Endress + Hauser Conducta Gesellschaft für Mess- und Regeltechnik mbH + Co. KG, Gerlingen (DE)

(72) Inventors: Tilman Benkert, Stuttgart (DE); Bjorn Haase, Stuttgart (DE); Gunter Jahl, Gerlingen (DE); Stefan Robl, Hunxe (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 16 days.

(21) Appl. No.: 14/842,993

(22) Filed: Sep. 2, 2015

(65) Prior Publication Data

US 2016/0063785 A1 Mar. 3, 2016

(30) Foreign Application Priority Data

Sep. 2, 2014 (DE) .......................... 10 2014 112 611

(51) Int. Cl.
*G07C 9/00* (2006.01)
*H04W 12/06* (2009.01)
(Continued)

(52) U.S. Cl.
CPC ..... *G07C 9/00309* (2013.01); *G07C 9/00007* (2013.01); *H04L 63/0869* (2013.01);
(Continued)

(58) Field of Classification Search
CPC ............ G07C 9/00309; G07C 9/00007; H04L 63/0869; H04L 63/20; H04W 12/04; H04W 12/06; H04W 4/008; H04W 12/08
(Continued)

(56) References Cited

U.S. PATENT DOCUMENTS 4,766,746 A * 8/1988 Henderson ............... G07C 1/32
340/5.65
2002/0180582 A1 * 12/2002 Nielsen .............. G07C 9/00103
340/5.6
(Continued)

OTHER PUBLICATIONS

Christoph Emsenhuber, "COM+ in der Prozessautomatisierung" Johannes Kepler University, Linz, Germany Oct. 2002 (with English abstract).

*Primary Examiner* — Edwin Holloway, III
(74) *Attorney, Agent, or Firm* — Mark A. Logan; PatServe

(57) ABSTRACT

A method for unilaterally or mutually authenticating at least one first unit, especially a mobile device, on at least one second unit, especially a field device, within a plant, especially in the area of process automation technology, with a communication line, preferably a wireless communication line, in place between the first unit and the second unit, comprising the steps of: establishing a security policy, with the security policy including rules for granting access of the first unit on the basis of at least one unlock key, and information to check the unlock key for validity; providing the security policy to the second unit; generating an unlock key for the first unit and providing the unlock key at the first unit; transfer of the unlock key from the first unit to the second unit and verification of the unlock key by the second unit using the security policy and, if applicable, granting access. Furthermore, a computer program product executes the method and a machine-readable data carrier includes the computer program product.

20 Claims, 14 Drawing Sheets

(51) Int. Cl.
*H04L 29/06* (2006.01)
*H04W 12/04* (2009.01)
*H04W 4/00* (2009.01)
*H04W 12/08* (2009.01)

(52) U.S. Cl.
CPC ............ *H04L 63/20* (2013.01); *H04W 4/005* (2013.01); *H04W 4/006* (2013.01); *H04W 12/04* (2013.01); *H04W 12/06* (2013.01); *H04W 12/08* (2013.01)

(58) Field of Classification Search
USPC ........................................................ 340/5.23
See application file for complete search history.

(56) References Cited

U.S. PATENT DOCUMENTS

| | | | | |
|---|---|---|---|---|
| 2009/0187969 | A1* | 7/2009 | DeFord ............... | G06F 21/6218 726/3 |
| 2011/0022192 | A1* | 1/2011 | Plache ............... | G05B 19/4188 700/28 |
| 2011/0072506 | A1* | 3/2011 | Law ................... | H04L 63/1416 726/11 |
| 2013/0031037 | A1* | 1/2013 | Brandt ................ | H04L 63/1408 706/12 |

* cited by examiner

METHOD FOR THE AUTHENTICATION OF AT LEAST ONE FIRST UNIT ON AT LEAST ONE SECOND UNIT

TECHNICAL FIELD

The invention relates to a method for authenticating at least one first unit, especially a mobile device, on at least one second unit, especially a field device, within a system, especially in the area of process automation technology, with a communication line, especially a wireless communication line, in place between the first unit and the second unit. The invention furthermore relates to a computer program product to execute the method and a machine-readable data carrier that includes the computer program product.

BACKGROUND DISCUSSION

Field devices serving to capture and/or modify process variables are frequently used in process automation technology. Field devices in general refer to all devices which are process-oriented and which provide or process process-relevant information. In addition to sensors and actuators, also units directly connected to a fieldbus are generally referred to as field devices, and which serve for communication with superordinated units, such as e.g. remote I/Os, gateways, linking devices and wireless adapters.

The company group Endress+Hauser offers and distributes a large variety of such field devices.

Authentication is proof (verification) of a characteristic claimed for an entity, for example the above-mentioned first unit which carries out its own authentication by supplying a particular contribution.

The authentication of the entity with regard to the claimed characteristic of authenticity, which may, e.g. be permission of an "existing access right" or "genuineness" allows the authenticated entity to conduct further action. The entity is then regarded as authentic.

An entity identified as authentic may optionally also be equipped with different authorizations. An authorization in the context of this document is the transfer of limited rights in a determined context to an entity, e.g. by certain acceptable modes and/or in a certain context, such as only reading access rights, combined reading and writing rights or even special administrator rights, which only selected entities may have.

An authentication is valid until the respective context is left or modified or until the respective mode is left or modified.

Wireless solutions are already available for many consumer applications. One example is radio solutions based on one of the standards from the Bluetooth family. With regard to measuring technology applications in the consumer area, state-of-the-art solutions are, for example, the wireless transfer of a sportsman's heart rate or the number of steps to a mobile display/control unit, e.g. to a mobile phone with an integrated Bluetooth interface.

Encryption is usually executed via a so-called "pairing process" during which a secret key is exchanged between the two communication partners. Due to the limitation of the remote stations, this key exchange usually occurs on the basis of an authentication using a key code of only 4 digits. Those 4 digits frequently are set to an (unalterable) standard value, e.g. 0000, especially for measuring devices without a display, which further reduces security.

This type of authentication optimizes operating convenience for the consumer client at the expense of security. Such minimum security is not sufficient for the security levels required for industrial plants. The German term "Sicherheit" may be translated into English as either security or safety. The English term security is more precise than the corresponding German word "Sicherheit". The term safety means that a system reacts as can be expected from its functionality. In short: it reliably works as it should. Security on the other hand refers to the protection of the technical processing of information and is a feature of a functionally reliable system. It is meant to prevent any unauthorized data manipulation or the disclosure of information. In the following, the German terms "Sicherheit" and "sicher" always refer to the feature of security if not expressly stated otherwise.

Another radio technology known from the IT field is the term WLAN (WiFi). "WLAN", especially WiFi security, is used to connect many first devices, e.g. several computers or mobile devices with a single second device, e.g. a router (one-to-many connection). WiFi is not, however, designed to connect a single first device, e.g. a computer or a single mobile device, with several second devices, e.g. several routers (many-to-one connection).

In an industrial context, there are up to several hundred field devices within a plant. These are, for instance, structured into various groups. There are, in turn, several different users for those field devices that service or calibrate field devices, etc. Those users usually have different authorizations with regard to the field device groups or the individual field devices. Users are regularly added, permissions modified, or users lose their access rights, e.g. when they leave the company. External users, such as fire fighting support staff in an emergency or external service providers, need temporary access to certain field devices. Furthermore, one has to take different security requirements for each system into account. For example, a higher standard applies for potable water supply than for wastewater. The security requirements in many cases therefore are very specific for certain applications and systems. A modification of the software/firmware of the individual field devices with regard to individual user authorizations and security features is not feasible for a large number of field devices.

Increased security requirements also apply, especially when access to an automation technology plant is granted via public networks such as mobile phone networks or the internet, or if access is accomplished via a radio interface, e.g. on the basis of a Bluetooth standard. Public networks and radio interfaces share the problem that it is easier to "attack" the access channel cryptographically than local, wired connections.

One has to take into consideration that so-called firewalls consciously separate the local network from public networks like the internet in many automation technology plants. On the one hand, this reduces the danger from attacks, on the other hand, security mechanisms based on internet servers are no longer available for the authentication system because the field device no longer reaches them. For example, corroboration of certificates such as those done by the TLS standard (Transport Layer Security, formerly SSL standard, Secure Sockets Layer) using central servers on the internet run by the offices issuing the certificates is not possible in many industrial plants.

In addition, the aspect of availability must be considered for field devices. For example, access to a field device for maintenance or during an emergency must not be prohibited by the fact that a hardware failure makes access to the user data bank on a central server impossible. In such cases, autonomous functioning of the field device is necessary, e.g. in such a way that known users have access using their last valid password.

On the other hand, it is not feasible for even a medium-sized plant with about 50 field devices and 15 users to manage individual accounts without a certain degree of central control of user management. When a user is added, for example, this user would have to be added to each of the 50 field devices first.

This is the reason why it is so tempting for the user of a plant to realize the obvious "solution", that all users share the same password, the consequence being that in the end, any security mechanism is thus effectively undermined.

Field devices in plants are frequently linked to a control center via an analog or digital interface, e.g. via fieldbus standards like PROFIBUS, FOUNDATION FIELDBUS, HART or alternatively, by transforming the measuring value into an analog current value of, for example, 4 to 20 mA.

At the time of sign-up, neither the fieldbus standards nor the respective control centers are designed to transfer the data connections for the transmission of information regarding user accounts, such as encrypted passwords or user rights.

One aspect that is inhibiting with regard to the application of increased security requirements in factory automation; process automation in particular also involves the available features of the integrated operating units, i.e. the display and operating options, for instance via a screen and keys. Since the casings are designed for an industrial environment with regard to dirt, explosion protection, temperature range or limited energy supply, this leads to the available features being so limited in many cases that entering a "safe" password, i.e. one that is difficult to guess, is very complicated. This is the case, for example, when there are only 2 keys available for operation. This aspect is particularly relevant for so-called pressure-tight explosion protected devices as the connection of switches/buttons for the user interface out of the pressure-tight casing causes high expenditure, and for this reason in many cases only a few operating switches are available.

SUMMARY OF THE INVENTION

The invention is based on the task to propose a security infrastructure which allows a safe, simple and flexible option to connect several second units, such as field devices, with a single first unit, e.g. a mobile device and allow user authentication. In other words, a safe login process should also occur via a mobile device such as a smartphone, laptop or tablet computer, i.e. via a device that needs to be designed to a lesser degree for dirt and rough conditions and that also allows for comfortable entry of "secure" passwords, e.g. via a touch screen.

This task is solved by a method for unilateral or mutual authentication of at least one first unit, especially a mobile device, on at least one second unit, especially a field device, within a system, especially in the area of process automation technology, with a communication line, especially a wireless communication line, in place between the first unit and the second unit. The method comprises the following steps: Establishing a security policy, with the security policy including rules for granting access of the first unit on the basis of at least one unlock key, and information to check the unlock key for validity; providing the security policy to the second unit, generating an unlock key for the first unit and providing the unlock key at the first unit; transfer of the unlock key from the first unit to the second unit and verification of the unlock key by the second unit using the security policy and, if applicable, granting access.

The information needed for authentication is therefore separated into several partial components in this invention: the security policy as well as one or several unlock keys. One advantage of the information required for authentication is that constant, rarely modifiable information such as the security policy may be separated from dynamic variables. This separation into security policy and unlock key also allows for an opportunity to add new authorized users, or new authorized mobile devices at a later time by a later transmission of the respective unlock keys to the field device. It further allows generating an unlock key for a new employee at a time after the field devices have already been put into operation.

In one advantageous further development, the unlock key is generated as a hardware-related unlock key based on specific data from the first unit, especially the serial number, international mobile equipment identity, international mobile subscriber identity, phone number of data saved on the SIM card.

In another advantageous further development, the unlock key is generated as a user-specific unlock key based on the specific data of a user of the first unit, especially name and user password.

This allows for individual users and/or individual mobile devices to be authorized. To increase the security level, both methods are used consecutively.

In one preferred embodiment, different rights are granted to a second unit depending on the unlock key. The unlock key itself accordingly already includes the respective rights. There are no other settings to be made, which reduces administrative effort. Examples of this are reading, writing, managing and the right to execute firmware updates or similar.

In one advantageous embodiment, the information to check the unlock key is a public master key from a central administrator. The public master key may, for example be generated from a private (and therefore secret) master key. The private master key, in turn, may consist of a password, preferably long and "secure", and, for example, at least a random number.

In order to increase security, the unlock key has a time limit.

In one advantageous further development, the user-related unlock key grants the right to generate further unlock keys. Such a user may therefore be regarded as a sub-administrator. This allows the generation of further unlock keys without knowing the private master key of the central administrator, which further increases security, as the generation of an unlock key can unambiguously be assigned to the respective sub-administrator.

The security policy preferably includes at least one of the following pieces of information: name of the plant, master key and information about which unlock keys in which combination grant access.

In one advantageous embodiment, the unlock key is supplied at the first unit on the basis of a text-based method, especially SMS, e-mail or instant messaging, or an optical method, especially via 2D code, for example matrix code, such as QR code or DataMatrix code. This constitutes a simple way of distributing the unlock key.

In a preferred further development, the security policy is saved on a server, especially additionally. This allows for several options that are described in the following.

A positive list and/or a negative list are preferably saved on this server, with the positive list or negative list, respectively, containing the authorized and/or blocked specific data of the first unit and/or the specific data or a user of the first unit. A negative list is also referred to as a blacklist or blocking list. By making an entry in such blacklists, an administrator may subsequently revoke access already granted via unlock keys.

In an advantageous embodiment, asymmetric cryptography with a secret private key and a corresponding public key is used, with the respective secrete private key required to generate an unlock key, and the public key used to verify authentications. This has the advantage that the crucial keys needed for generating an unlock key are known to fewer part systems and therefore the risk of unlock codes being generated by unauthorized persons is reduced.

For asymmetric cryptography, a cryptography system on the basis of elliptical curves is preferred. Methods on the base of elliptical curves show the least complexity with regard to processing power. They also have the advantage that a few bytes suffice for the digital coding of a digital signature.

Alternatively, symmetric cryptography is used in one embodiment, which uses the same key both for the generation and verification of unlock keys. This embodiment is mainly advantageous for systems in which the processing power for the numeric operations of asymmetric cryptography is insufficient.

In one further development, the second unit is a field device with two-wire technology. Devices with two-wire technology usually work using very little energy and are very energy and cost efficient.

The field display does not have any display. The display frequently is the main energy consumer. In addition, less space is needed.

In one advantageous embodiment, the method is carried out as a decentralized method, in particular, no central system like a control center is required. The method according to the invention therefore also works when the central administration unit, e.g. the control center, fails or if there is no connection to the control center.

Preferably, between the first and second unit, there is a wireless connection, especially a wireless connection via Bluetooth or Wifi.

The task is further solved by a computer program product that is adapted in such a way that it executes at least one of the methods described above.

The task is further solved by a machine-readable data carrier that comprises the computer program product as described above.

Preferably, the machine-readable data carrier is found on/in the first and/or second unit.

BRIEF DESCRIPTION OF THE DRAWINGS

The invention is further illustrated referring to the following figures.

DETAILED DISCUSSION IN CONJUNCTION WITH THE DRAWINGS

The reference symbols of similar features remain the same in the figures. In the following, and especially in the ifigures, some English terms are used. The list of reference symbols shows the English terms with their German translation in brackets and printed in italics.

Figure 8:
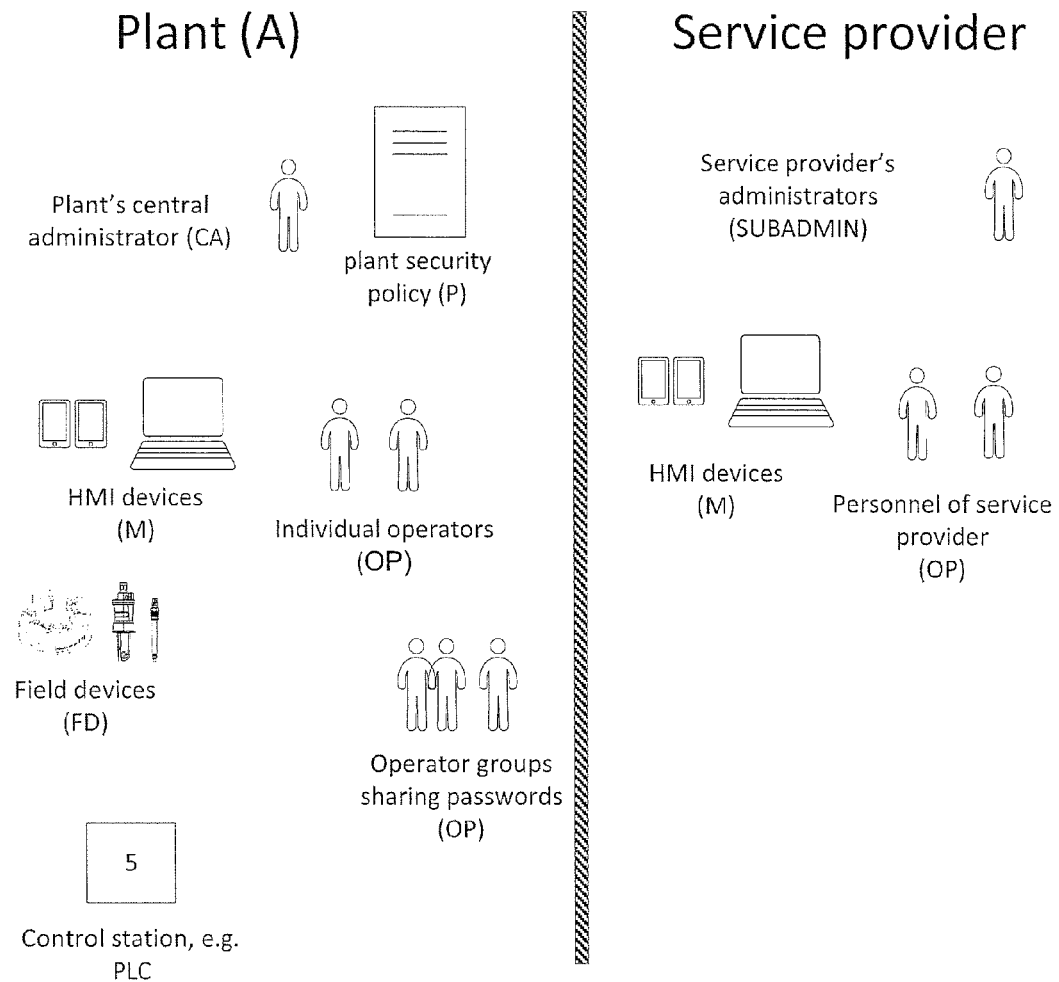
FIG. 8 shows a schematic overview of the relevant persons and devices in the context of the invention.

Firstly, a plant A is to be examined where the method according to the invention can be used. FIG. 8 gives an overview of the persons and devices concerned. Plant A includes, as its main component, at least one first unit M and at least one second unit FD. We shall first expand on the second unit FD.

We can see a second unit, in this example a field device (FD) in process automation technology, e.g. a sensor. To be more precise, image 1 shows two field devices FD1 and FD2 that are both a "second unit FD" type device. The terms "field device" and "second unit" are used synonymously in the following. The field device FD is especially a field device in two-wire technology. The field device FD has a rather "simple" design in terms of operation; the field device in particular shall have only rudimentary options for inputting and outputting. The field device, for example, has only a few buttons and switches and does not have any display, or only a "simple" one, i.e. a two-color display with a few symbols to be displayed or even only some LED signal lamps.

The sensor may, for instance, be a pH, redox potential, ISFET, temperature, conductivity, pressure, oxygen, especially dissolved oxygen, or a carbon dioxide sensor; an ion-selective sensor; an optical sensor, especially a turbidity sensor, a sensor for the optical determination of the oxygen concentration, or a sensor to determine the number of cells and cell structures; a sensor to monitor certain organic or metallic combinations; a sensor to determine the concentration of a chemical substance, for example a certain element or a certain combination; or a bio-sensor, e.g. a glucose sensor or a sensor to determine a physical parameter such as pressure, temperature or throughput. The field device FD determines the measuring value of a medium 1, in the example shown in a beaker. However, other containers such as leads, pools, containers, pipes, pipelines, etc. are possible.

The field device FD communicates with a superordinate unit, e.g. directly with a control system 5 or a transmitter. The communication to the control system 5 is done via a bus 4, e.g. via HART, PROFIBUS PA, PROFINET, Modbus, FOUNDATION Fieldbus or EtherNet/IP. It is also possible to design the interface 6 as a wireless interface, e.g. according to the WirelessHART standard (not shown). In addition, optionally or additionally, a 4.20 mA interface is provided for. If the communication is done additionally or alternatively to a transmitter instead of directly to the control system 5, either the bus systems mentioned above may be used for communication, or a proprietary protocol, e.g. of "Memosens" type is used. The Memosens protocol or field devices communicating via Memosens protocol are distributed by the applicant.

An interface 6 is provided for at the bus-side part of the field device FD. The interface 6 connects the field device FD to the bus 6. The interface 6 may e.g. be designed as a galvanic isolating interface, especially as an inductive interface. In the example, the interface 6 consists of two parts with a first part on the field device side and a second part on the bus side. They can be joined via a mechanical plug connection. In one embodiment, the interface 6 is used to send data (bidirectional) and energy (unidirectional, i.e. from the superior unit 5 to the field device FD).

The field device FD preferably also includes an interface 2, possibly wireless, for the communication 3 with a first unit (mobile device M) which is for example designed as a Bluetooth interface, Ethernet interface, Wifi interface or a radio connection on the basis of the radio standard IEEE 802.15.4 like Zigbee. The Bluetooth interface especially satisfied the protocol stack low energy as "Bluetooth Low Energy", (also known as BTLE, BLE or Bluetooth Smart). The field device FD therefore at least satisfies the "Bluetooth 4.0" standard.

In addition to at least one field device FD, plant A comprises at least one first unit. The first unit is designed as a mobile device M, e.g. as a mobile phone, smartphone, tablet or personal digital assistant (PDA). Alternatively, a portable computer, notebook, sub-notebook, netbook or desknote may be used. The terms "mobile device" and "first unit" are used synonymously in the following. As one special alternative, an industrial PDA is used. This is also available in an ex-embodiment, e.g. by Endress+Hauser with the product name "Field Xpert SFX370". An ex-embodiment here is to be understood as the ignition protection type "II 2G Ex is IIC T4 Gb IP64" or similar. The mobile device M has a display and operating elements. Modern mobile devices have a touch screen, so operation is directly controlled on the display.

In the following, we shall look at the communication of the mobile device M with the field device FD via the connection 3. In a first variation, each field device FD has exactly one mobile device M assigned to it. Preferably, a mobile device M may, however, communicate with several field devices FD1, FD2 and/or several mobile devices M may communicate with one or several field devices FD1, FD2.

The field device FD also comprises a machine-readable data carrier for this purpose, especially a memory 7, with memory 7 comprising a computer program product that is adapted in such a way that it executes the method according to the invention or certain steps thereof. It goes without saying that components that might be required such as a computing unit are also part of the field device FD (those are not illustrated). In one advantageous embodiment, the mobile device M also comprises a machine-readable data carrier that includes a computer program product to execute the method according to the invention or certain steps thereof. The mobile device M is preferably also equipped with a camera and/or a connection for memory media such as memory sticks, mobile hard disks, so-called SD memory cards or memory media on the basis of a wireless technology (such as RFID or NFC).

The field device FD also comprises a machine-readable data carrier, especially a memory 7, with memory 7 comprising a computer program product that is adapted in such a way to execute the method according to the invention or certain steps thereof. It goes without saying that components that might be required, such as a computing unit, are also part of the field device FD (not illustrated). In one advantageous embodiment, the mobile device M also comprises a machine-readable data carrier that includes a computer program product that executes the method according to the invention or certain steps thereof.

Figure 2:
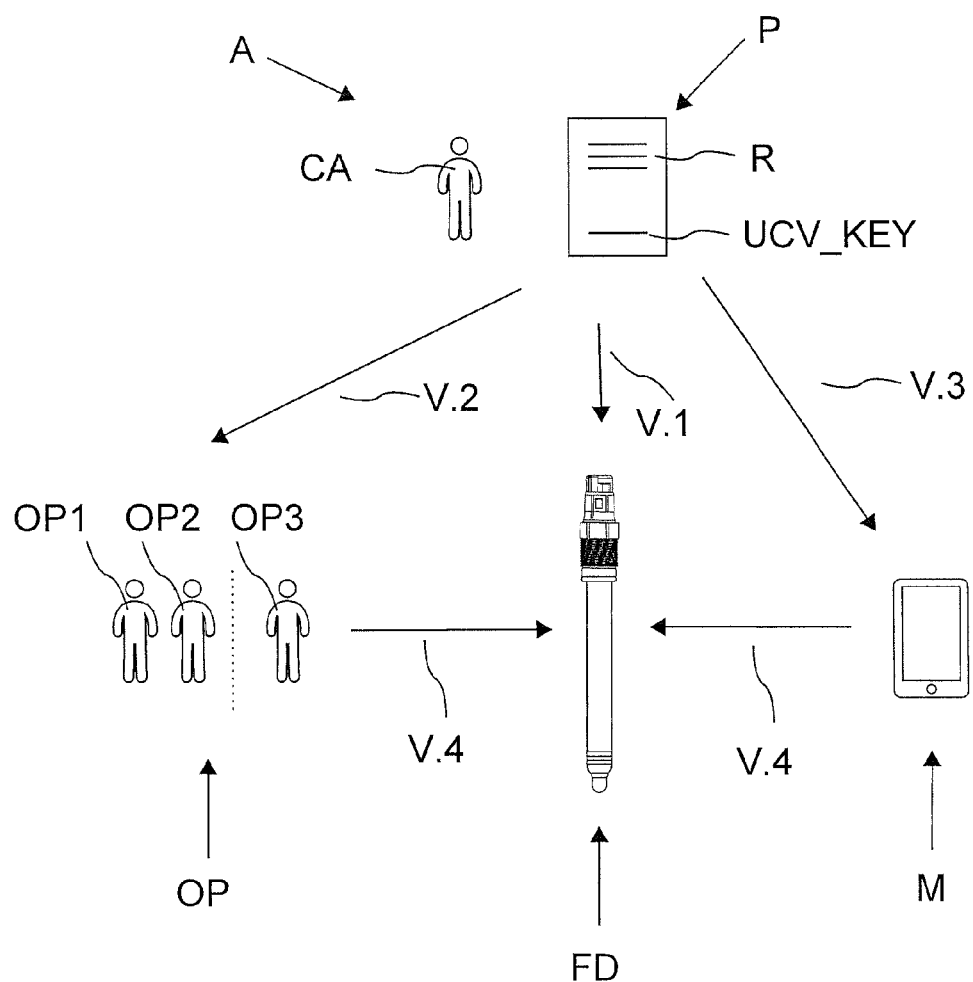
FIG. 2 shows a schematic flow chart of the method according to the invention.

FIG. 2 shows a schematic flow chart of the method according to the invention.

The plant A comprises a central administrator CA, in the following referred to as administrator. The administrator CA is the central communication partner for the administration of the field devices FD and the mobile devices M. There is a security policy P for the plant A (English: security policy). The security policy P here consists of two components, the rules R and the key information UCV-KEY (the English acronym for unlock key verification key) which allows the verification of the validity of the unlock keys ULK described below.

The rules R to grant access are summarized in digital form, which the field device FD may evaluate and include all information determining the way authentication on plant A must be completed. The rules may, for example, state that access to the field device FD is not granted from any mobile device M, but only from selected mobile devices M that have explicitly been authorized for the field device FD or plant A and that are able to prove their relevant authorization by displaying a respective "unlock key ULK" valid for plant A.

This allows the administrator CA to ensure that access is only effected via mobile devices M that are subject to suitable security scans and, for example, have an up-to-date virus scanner installed.

In addition, the rules R alternatively or additionally may state that access should be limited to certain users OP. Such users OP are authorized to work on plant A, and this authorization is proved by their having a user-related unlock key ULK, and can prove knowledge of the password saved in the user-related unlock key ULK.

The course of the authentication process executed by the field device thus includes as one component the transfer of unlock keys ULK to the field device FD both for checking device authenticity (for the mobile devices M) and for verification of the authenticity of people, i.e. users (OP), as well as the verification of the unlock key ULK validity by the field device using the key UCV_KEY that is also included in the security policy P.

The information needed for authentication is therefore separated into several part components in this invention: The security policy P as well as one or several unlock keys ULK.

The advantage of the information required for authentication is that constant, rarely modifiable information such as the security policy may be separated from dynamic variables. This separation into security policy P and unlock keys ULK also allows for an opportunity to add new authorized users, or new authorized mobile devices to the plant at a later time by subsequent transmission of the respective unlock keys ULK to the field device FD. This is to be explained in the following.

The course proposed according to the invention is that first the security policy P is transferred to the field device FD. Thus the field device FD has information available about the rules R on plant A and the ability to verify the validity of unlock keys ULK using the key UCV_KEY.

At this point in time, the field device FD does not yet have any information about which mobile devices M and which users OP have access rights.

In a second step, the administrator CA or a staff member commissioned by the administrator SUBADMIN generates the unlock keys ULK for mobile devices M and/or users OP for plant A as described in the rules R.

With respect to the unlock keys ULK, we can distinguish between two cases:

In the first case, the unlock keys ULK are generated as a hardware-related unlock key using specific data from the first unit, i.e. the mobile device M, see the reference symbol V.2 in FIG. 2. Examples of this are, for instance, serial number, International Mobile Equipment Identity, International Mobile Subscriber Identity, phone number or other data saved on the SIM card (English: subscriber identity module) of the mobile device M. In this way, a specified mobile device M is validated for use on a specified field device FD.

In the second case, the unlock keys ULK are generated as a user-related unlock key using specific data of a user OP of the first unit M, see the reference symbol V.3. Examples of this are, for instance, name and user password of the user OP. In this way, a specified user OP is validated for a specified field device FD or the entire plant.

The unlock keys ULK are preferably limited in time.

For this, the unlock keys ULK consist of two part components. One data field DB and a digital signature field DS.

The data field DB codes the characteristics of the unlock key ULK. For a user-related unlock key ULK, the data field DB for example contains information such as name or login of user OP, coding of the authorization of the user OP (e.g. write, read, or administrator rights) for plant A, expiry date of the unlock key ULK and/or information that allow for verification of user authenticity such as an encrypted coding of the password for user OP.

The rules R in the security policy P determine which individual elements are required in which combination.

In the case of an unlock key referring to a mobile device M, the data field DB for example contains information such as the name and/or inventory number of the mobile device M, the type of the mobile device M, the authorization coding of the mobile device (e.g. write, read or administrator rights) for plant A, expiry date of the unlock key ULK and/or information that allow for verification of the authenticity of the user OP (e.g. by password verification).

The rules R in the security policy P once again can be set to determine the individual elements and their respective combination.

For the digital coding of the data fields DB, there are, for example, data formats in the current state of technology such as XML or DER/BER.

The unlock keys ULK, according to the invention, contain a digital signature field DS in addition to the data fields DB described above. The digital signature field DS is calculated from the content of a data field DB and a secret administrator CA key.

The field device has a unit to verify a digital signature. This unit allows the field device to verify whether the unlock key ULK is valid for plant A using the key UCV_KEY that is saved in security policy P.

The generation of the digital signature DS via the data field DB of an unlock key ULK may either be managed via symmetric or asymmetric encryption techniques. In case of symmetric technologies such as AES, DES, Blowfish, TEA or XTEA, the same secret key UCV_KEY is used to generate the signature field DS that is also used for verifying the validity of the signature field DS in the field device. The signature field DS in this case is created using algorithms that are known to experts under the general headings of Message Authentication Code or Message Integrity Code.

In case of asymmetric technologies, the plant administrator uses his/her private key to generate the signature field DS while the key UCV_KEY used by the field device FD is formed by the public key of the plant administrator CA.

The advantage of using symmetric technologies is that they need less processing power and may also be used on field devices FD with low performance capability if required.

According to the invention, the unlock keys ULK generated are transferred to the field device in a next step. This transfer may alternatively be completed via the fieldbus interface to the control center, via direct access to the field device FD without involving the mobile device M or via the interface 3 to the mobile device M.

In case there is no data connection via a network or similar between the computer used by the administrator CA to generate the unlock key ULK, it may be advantageous to realize the unlock key ULK as a graphic code, e.g. a 2D data matrix or QR code and then print out this code on a medium, such as a paper or a plastic card, and import it via a camera integrated into the mobile device M. As an alternative, the unlock key ULK may be transferred to the mobile device M via a text-based method, especially SMS, e-mail or instant messaging or a central data base server. Another option is a transfer using memory media, such as USB sticks, memory cards or memory media based on the RFID or the NFC standard.

Step V.1 involves the transfer of the security policy P including the rules R and the verification key for the unlock keys UCV_KEY to the field device FD. This occurs, for example, initially upon commissioning the field device FD in plant A, e.g. via bus 4. This step can be extended to include other basic settings such as current spread, measuring value averaging, measuring range configuration, etc.

Unlock keys ULK (on the mobile device M) and security policy P (on the field device FD) are, as mentioned above, generated, stored and processed separately.

This further allows generating an unlock key ULK for a new employee after the field devices FD have already been commissioned.

Once the field device FD has received both the security policy P and the unlock keys ULK, the field device is able to verify the authentication. The first step of this process is a verification by the field device of whether the unlock keys ULK required for the sign-in according to the rules R. If required unlock keys ULK are missing, the field device FD may request them from the mobile device M using a suitable protocol. The mobile device M may then transfer the required unlock keys ULK.

In a next step, the field device may use the unlock key verification key UCV_KEY known to it (from the security policy P) to check whether the unlock keys ULK have a valid signature.

In a next step, the field device may derive further steps depending on the information relayed in the unlock keys ULK, such as checking whether a user OP on the mobile device M knows the user password implicitly stored (e.g.

saved in encryption) in the user-specific unlock key. This also includes checking, for example, whether the expiry date saved in the unlock key has been exceeded or not.

It is possible to generate a user-related unlock key that is authorized to generate other unlock keys ULK. This may, for example, be useful if the plant operator CA does not plan on doing the maintenance work for the field devices himself, but wishes to transfer this task to a specialized service provider for a limited time, who then uses own staff and own mobile device M. In this case, the organization of the service provider may name a sub-administrator SUBADMIN for this. The administrator CA may transfer an unlock key ULK to the sub-administrator SUBADMIN responsible for the service provider that allows said sub-administrator to unlock their own mobile devices M and their own staff OP for access to plant A. Thus, the user accounts of the service provider can be managed without the plant operator CA being involved.

This is one of the main advantages in using digital signature fields DS generated on the basis of asymmetric (public/private) technologies. When asymmetric technologies are used, the sub-administrator SUBADMIN him/herself does not necessarily need to know the master key of the administrator CA to generate signatures.

Depending on the unlock key ULK, the user OP is granted different rights (authorizations) on the field device FD. Possible rights are just reading, writing, managing, the right to execute firmware updates or similar. In this way, a user OP may also have different unlock keys ULK that grant him/her various rights. FIG. 2 shows different users OP, namely OP1, OP2 and OP3. The dashed line between OP2 and OP3 is to indicate that the users are divided into groups. Different groups have different rights or tasks with regard to the field devices. In the same way (though not shown), the mobile devices or the field devices may be separated into groups which then require and/or provide other rights.

In the following, a concrete example of an embodiment is described that is implemented on the basis of asymmetric cryptographic technologies.

The security policy P also includes information to validate unlock keys ULK in addition to the rules R. If the rules, for example, imply that for granting access the field device FD is supposed to check that both the mobile device M and the human operator OP are directly or indirectly (e.g. via a sub-administrator SUBADMIN) have been authorized by an administrator CA, granting access, this involves the following steps:
    determining the required unlock key ULK to grant access according to the rules R.
    transferring the unlock key ULK to be used for the mobile device M and/or the operator OP to the field device FD.
    verifying the unlock key ULK validity on the basis of the verification key UCV_KEY known to the field device FD as part of the security policy P. The field device FD will then check whether the unlock keys ULK were generated directly or indirectly by the administrator CA of the plant and are therefore valid for the plant.
    verifying the user OP authenticity and/or the authenticity of the mobile device M via the user password saved in the user-related unlock key and/or a secret key of the mobile device saved in the device-related unlock key.

This means that the method mainly consists of the following part components: The administrator CA has an algorithm to generate a digital signature that he uses to equip the unlock keys ULK with his/her signature, i.e. to assign a cryptographic feature only he/she may generate. The administrator CA adds any information, i.e. key information UCV_KEY to the security policy P which are needed to allow the field device FD to verify whether an unlock key ULK transferred to the field device FD by a third party has been signed by the administrator CA. The field device FD thus has an algorithm that allows it to verify whether an unlock key ULK transferred to the field device FD by a third party has been signed by the administrator CA or not.

In the following, the invention shall be described in more detail on the basis of the concrete embodiment shown in FIGS. 3 to 7.

Figure 1:
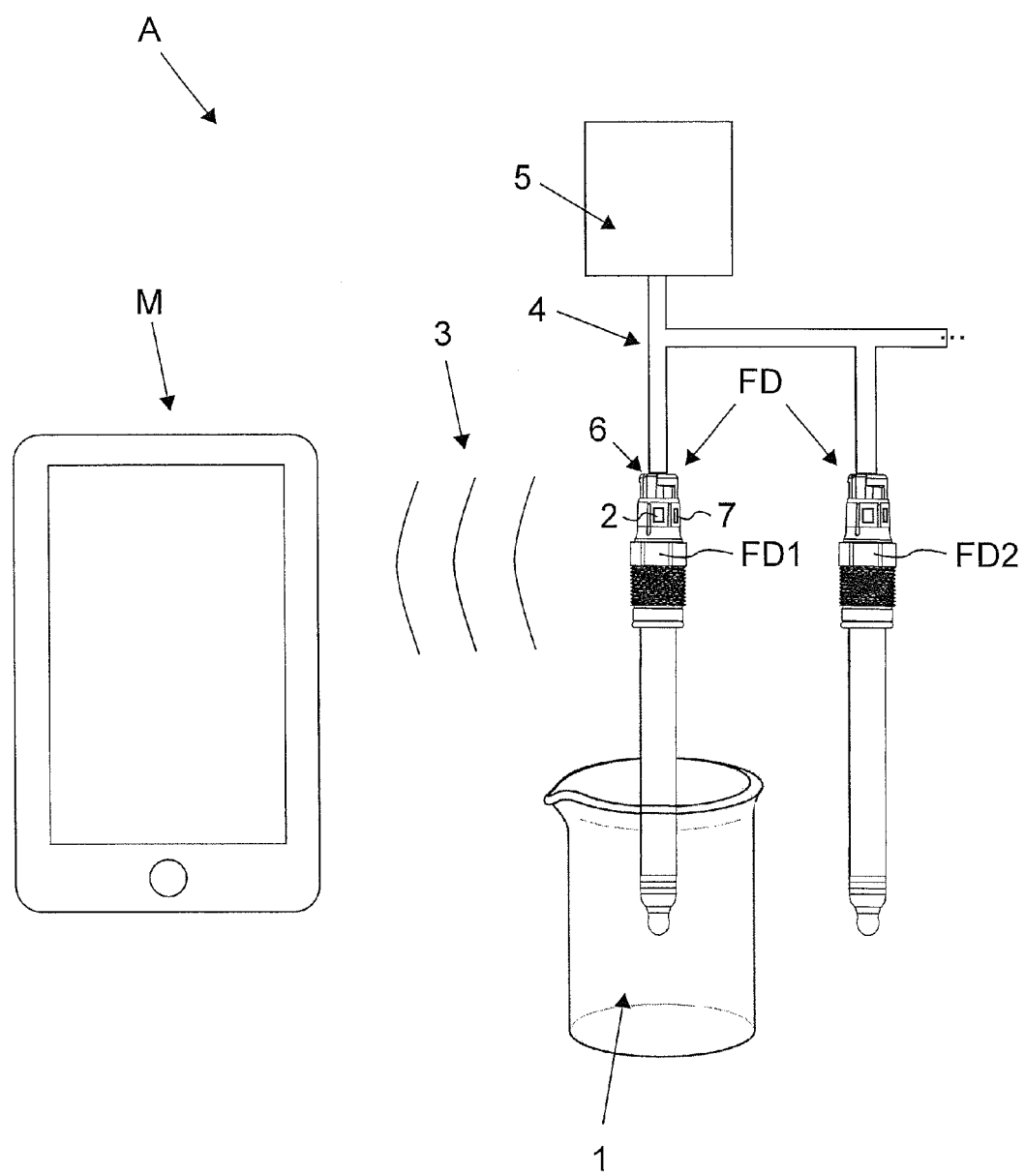
FIG. 1 shows a plant utilizing the method according to the invention.

It should be noted here that the unlock key verification key referenced as "UCV_KEY" in FIGS. 1 and 2 is formed using a public key from the administrator CA using the reference "PUBLICK_CA" in illustrations FIGS. 2 to 7 of the embodiment described in the following.

FIG. 3 shows how authentication according to this invention works on the basis of a so-called asymmetric method.

A method using a key pair consisting of a public and a private key is used. Such asymmetric signature method s are characterized by the fact that a digital signature may only be generated using the private key, while the public key is sufficient to verify a signature.

The current state-of-the-art involves various method s. One especially involves the algorithm classes RSA, named after their inventors Rivest, Shamir and Adelston, the digital signature algorithm (DSA) based on prime number objects and digital signature method s on the basis of elliptic curves (English: Elliptic Curve Digital Signature Algorithm, abbreviated ECDSA).

Methods on the basis of elliptic curves show the least complexity with regard to processing power. They also have the advantage that a few bytes are sufficient to digitally code a digital signature, e.g. 64 bytes for digital signatures on the basis of the EdDSA as a variation of the signature method on the basis of elliptic curves (hence, ECDSA), here on the basis of the so-called Curve25519. This is the reason why this embodiment refers to this class of algorithms. Experts shall alternatively also consider other asymmetric method s such as the ECDSA standard or signatures on a DSA and RSA basis.

Figure 3A:
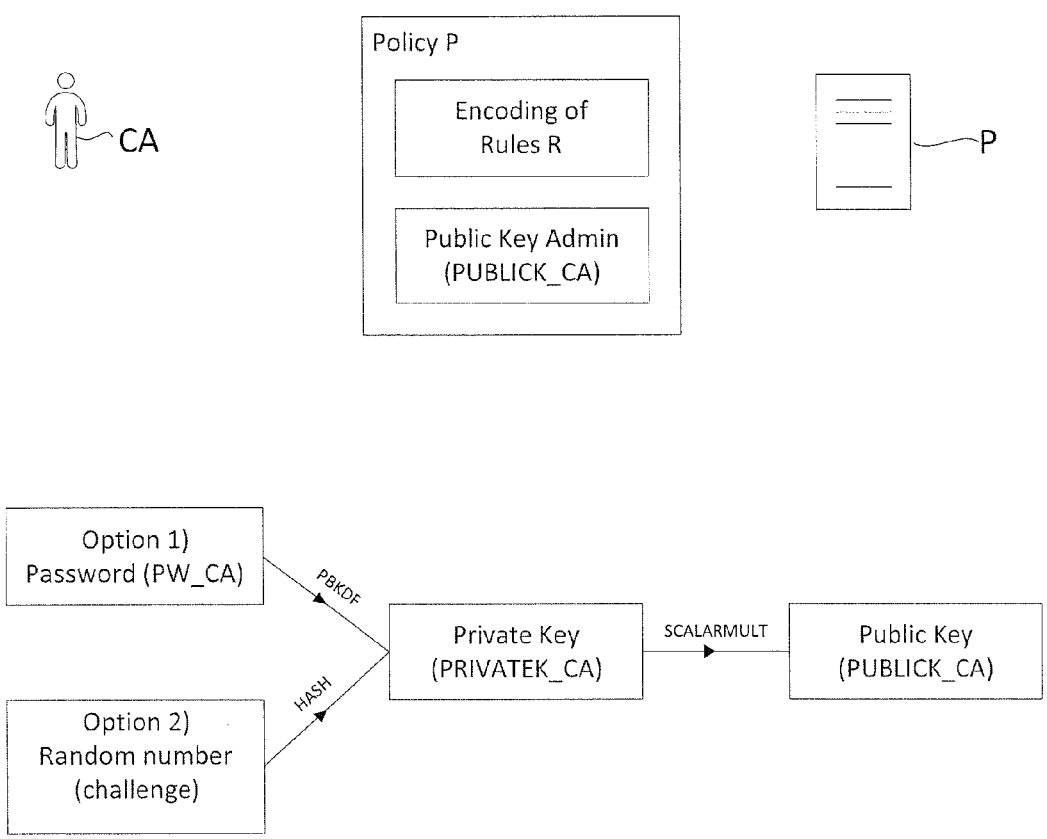
FIG. 3a, 3b and 3c show an embodiment of the method according to the invention to generate key data for the identification of a device or a person, with FIG. 3a establishment of the security policy by the administrator, FIG. 3b generating an unlock key for a user, and FIG. 3c generating an unlock key for a mobile device.
Figure 3B:
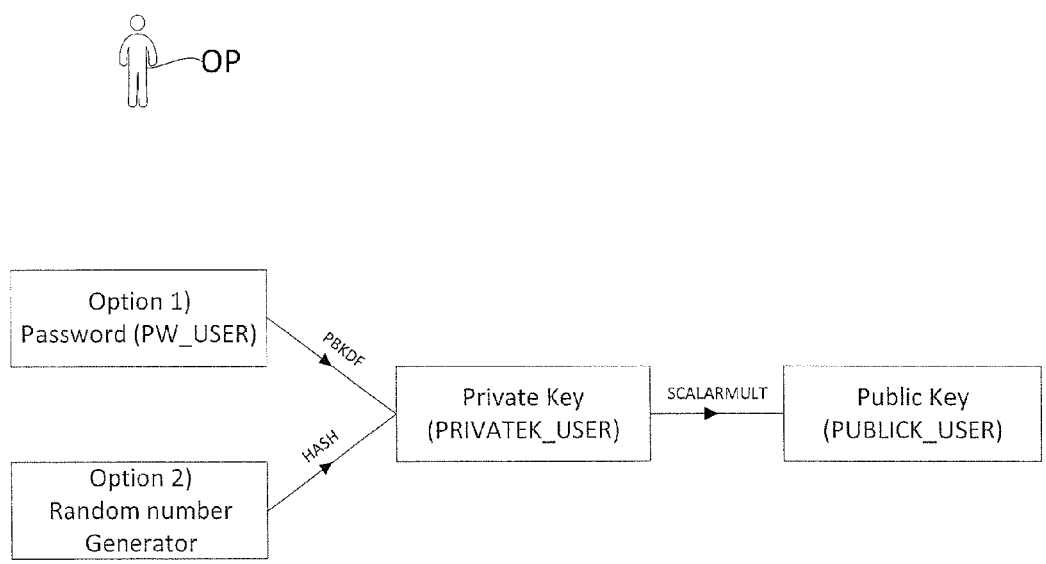
Figure 3C:
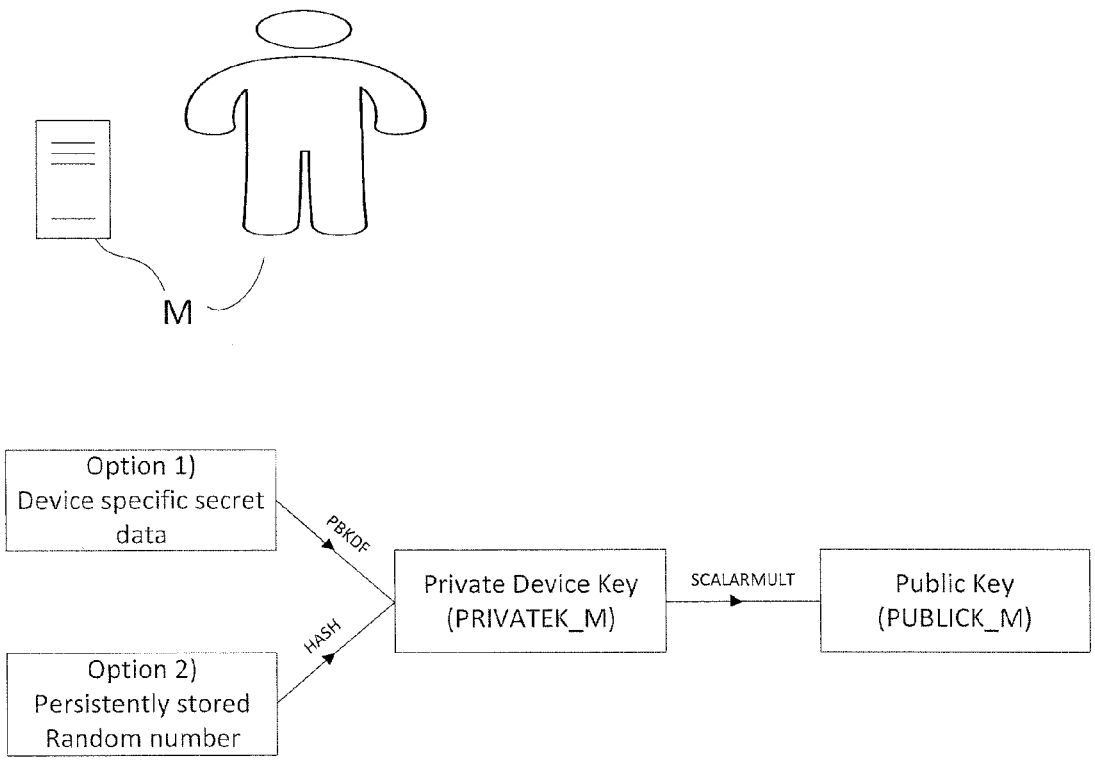

FIGS. 3a, 3b and 3c show, as an example, how a key pair for administrator CA, a user OP or a mobile device M may be generated.

The basic method may be the same for all three groups. The administrator CA has only the extra characteristic that, in contrast to the other cases, his/her public key is saved as part of the security policy P in the field devices FD. For the operator OP (see FIG. 3b) the public key may be saved as a part of the user-related unlock key ULK and, for example, be used to verify the password of the operator OP in the course of the authentication process by the field device FD. In the case of a mobile device M (see FIG. 3c), the key may be saved in the hardware-related unlock code ULK to check whether the mobile device M has access to a secret saved only on this hardware component.

In one advantageous embodiment, the key pair may be derived from a password. This process is to be described using the example of the administrator CA from FIG. 3a. This method can be applied directly to the cases of FIGS. 3b and 3c.

For this purpose, the character string of the password PW_CA is transformed into a private key with a defined bit length using a cryptographic one-way function PBKDF using the connection PRIVATEK_CA=PBKDF(PW_CA). Experts refer to this as the class of so-called "password-based key derivation functions" (acronym: PBKDF) or so-called password hashing algorithms on the basis of various standards that differ in their numeric complexity and, for example, are preferably constructed in a way that allows implementation only on large CPU systems such as PCs and smart phones and are, e.g. not efficiently executable on parallel graphic card accelerators and mainframe computers with many small parallel CPUs in order to make so-called dictionary attacks on passwords more difficult. One example for PBKDF one-way functions would be the PBKDF2 standard that is nowadays regarded as weak, which is used, for example, in Wifi systems, or the algorithm proposals entered password hashing competition during the current cryptography competition, see https://password-hashing.net/faq.html (accessed August 2014).

The private administrator key PRIVATEK_CA calculated in such a way is then realized as the respective public key PUBLICK_CA=SCALARMULT(PRIVATEK_CA) using a second algorithm. In FIG. 3, this algorithm is referred to as a scalar multiplication, a term generally used in connection with elliptic curve algorithms. It refers to a mathematical operation based on a point set defined by an elliptic curve. In this point set, a so-called base point BP is selected. The elliptic curve is characterized by the fact that there is a link between two points on the elliptic curve called a "point addition", with the result of the addition of two points also being a point on the elliptic curve. "Scalar multiplication" of the base point with a scalar n in this context corresponds to the process of repeating the addition of the base point BP n times. The result are the coordinates of a point on the elliptic curve and the coding of the coordinates of this point results in the public key. In case of FIG. 3, the private key PRIVATEK_CA is formed by the scalar number, and the public key by coding the point coordinates on the elliptic curve PUBLICK_CA.

For the key saved for the method according to the invention it is advantageous that they have a high level of data entropy that determines the average number of arithmetic operations required to break the key by using so-called "brute force" algorithms that systematically try out keys. For this reason, it is advisable for applications with high security to generate the key on the basis of a random number of, e.g. 256 bit length instead of on the basis of a potentially weak password. In this case, the secret key PRIVATEK_CA bay also executed on the basis of a cryptographic HASH algorithm that does not have to have an intentionally high numeric complexity like a PBKDF function. In one advantageous embodiment, the rules R of the security policy P demand the use of a minimum password strength.

Experts shall also consider equivalent method s apart from the use of elliptic curves, e.g. on the basis of RSA and DAS. In case of DSA, for example, the scalar multiplication operation would be replaced by the potentiation of a number on the prime number set. In case of RSA, experts would add the additional step of a prime number search since the result of the PBKDF function generally is not a prime number, while RSA needs a prime number to use for its private key.

Figure 5A:
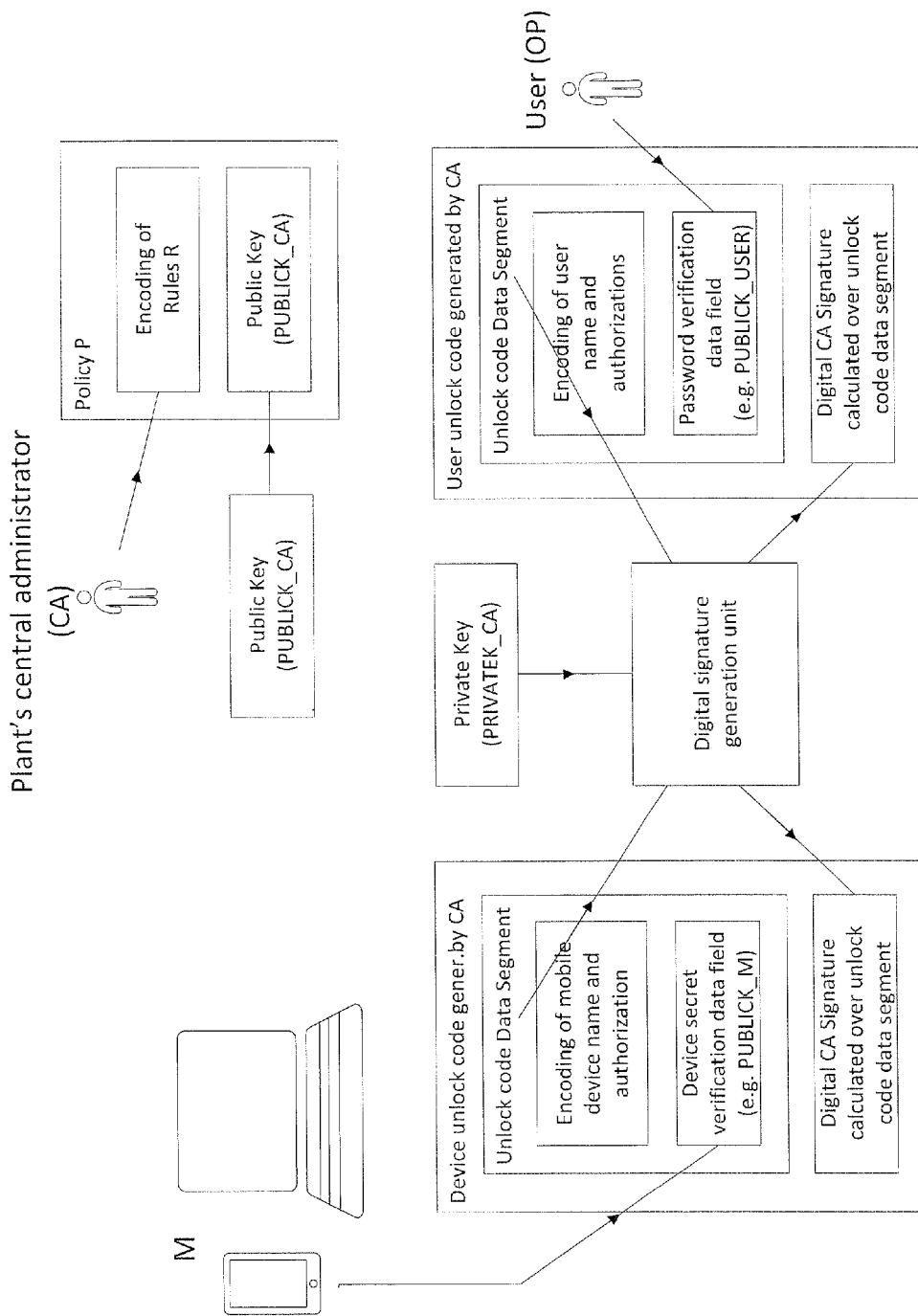
FIG. 5a and 5b show an example of an embodiment of the method according to the invention to generate an unlock key according to the invention for users and devices.

FIG. 5 shows how a device-related and a user-related unlock key ULK can be generated on the basis of the generated key pairs.

For this purpose, the administrator firstly generates a data field DB to contain all the information describing the user OP or the mobile device M, e.g. in the form of an XML or DER data format (from the X.509 standard family). The next step is then to calculated a digital signature DS using a signature generation unit for this data field DB. This process requires the private administrator key. In addition to PC programs, so-called WEB applications, a security dongle is an acceptable option, i.e. cryptographic co-processors which may, for example, be added to the USB interface of a computer unit. The combination of the data field with a respective signature field DS that has been calculated results in the unlock key ULK.

User-related and device-related unlock keys ULK differ only with regard to the information saved in the data field DB in terms of their concept. Accordingly, a device-related unlock key shall include information such as the serial number, inventory number, etc. of the mobile device M, whereas a user-related unlock key includes names, personal data, etc. (see also above).

Preferably, the data field of an unlock key ULK also includes an individual data field that allows verification of the authentication of the user OP and/or the mobile device M. As one example, we suggest saving the public key of the mobile device M and/or the user OP in the data field DB derived as shown in FIG. 3.

This serves to later allow the field device FD to check the authenticity of the mobile device M and the user OP without transferring the user password or the secret key to mobile device M to the field device in plain text.

Figure 5B:
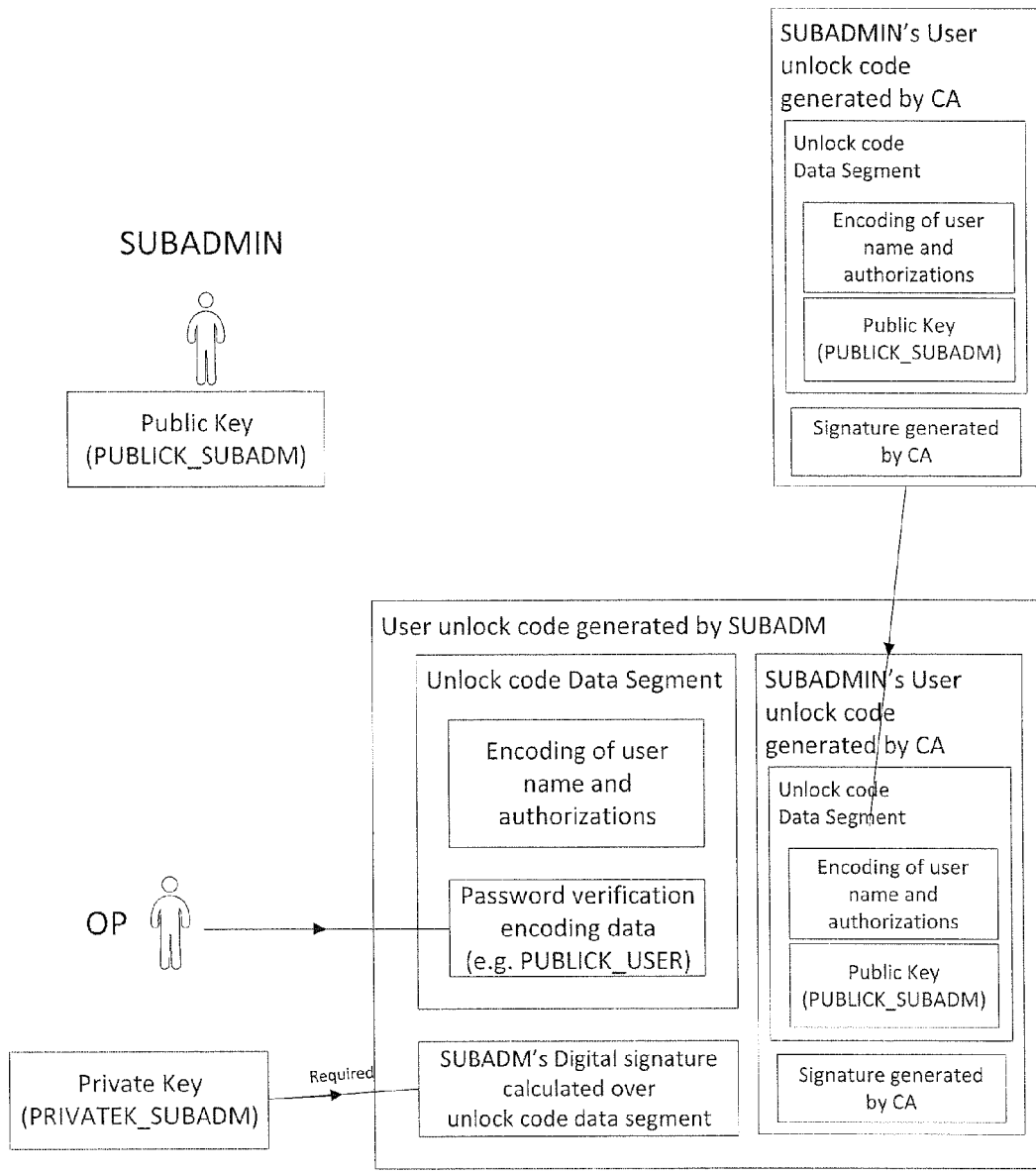

FIG. 5b shows how it is possible to grant users the right to generate a valid unlock key ULK without giving them information about the private key of the administrator CA.

For this purpose, the administrator CA creates a respective unlock key ULK for the sub-administrator SUBADMIN whose data field DB includes an individual data field that authorizes the sub-administrator SUBADMIN to generate unlock keys ULK. This unlock key ULK of the sub-administrator SUBADMIN also includes the public key of the sub-administrator SUBADMIN. The sub-administrator SUBADMIN may now generate a data field for a new unlock key ULK and sign it using his/her private key. In contrast to an unlock key ULK generated by a central administrator CA, the sub-administrator SUBADMIN adds his/her own unlock key to the unlock key he/she generates which then identifies him/her as an authorized sub-administrator via the central administrator's CA signature.

The field device FD now firstly can determine using the signature of the central administrator CA whether the sub-administrator SUBADMIN has been authorized by the central administrator CA to generate unlock keys him/herself. Then, the field device FD may proceed to check whether the unlock code presented has actually been signed by the sub-administrator SUBADMIN.

Figure 4A:
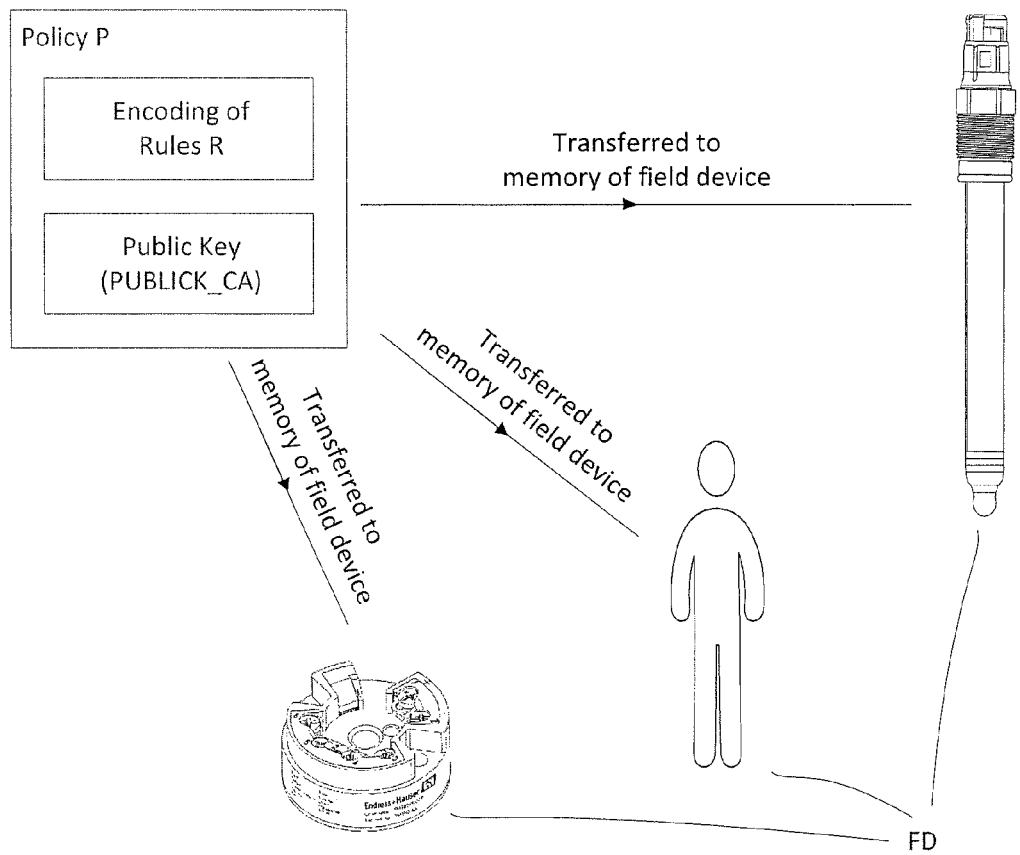
FIG. 4a and 4b show an example of an embodiment of the method according to the invention to transfer the data required for authentication to field devices.
Figure 4B:
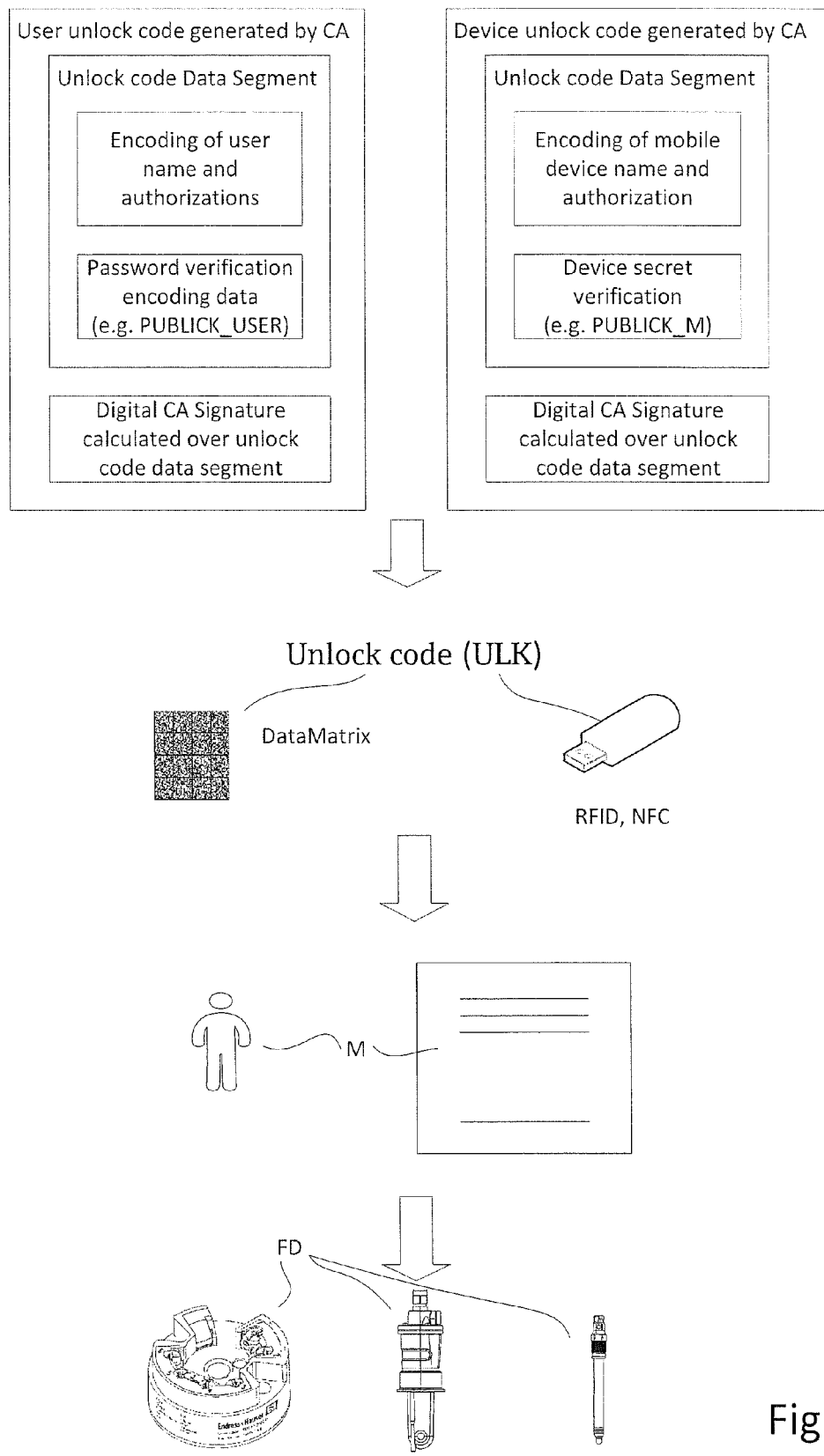

FIG. 4 shows how the information described is transferred to the field device. The transfer of the security policy P to the field device FD as shown in illustration 4a is done via the fieldbus interface, the exchange of memory media such as memory cards or memory sticks or via an interface to the mobile device M or any other communication channel. FIG. 4b shows how information such as signed blacklist entries (see below) or unlock keys ULK may reach the field device. One can see that saving the authentication information as unlock keys ULK in the form of unlock keys especially allows that a user OP or a mobile device M autonomously provides all the information needed for their login to the field device FD itself. For example, a user receives the unlock key ULK for his/her person as a graphic code saved on a printed document, then reads this with his/her mobile device M and transfers it to the field device FD using the mobile device M via the interface 3. This procedure only requires the administrator CA to contribute by generating the unlock key ULK. The administrator CA does not have to physically access the field device itself to enter the authentication data of the user OP into the field device FD, e.g. by adding it to the list of authorized users of the field device FD.

The user OP hi/herself can now rather physically access the field device FD with the information saved in the unlock key ULK, namely that this person has access rights. The unlock key ULK of the new user is in this case available on the mobile device M and may be made available, e.g. via the camera of the mobile device M if required, and is transferred to the field device FD when needed.

Figure 6A:
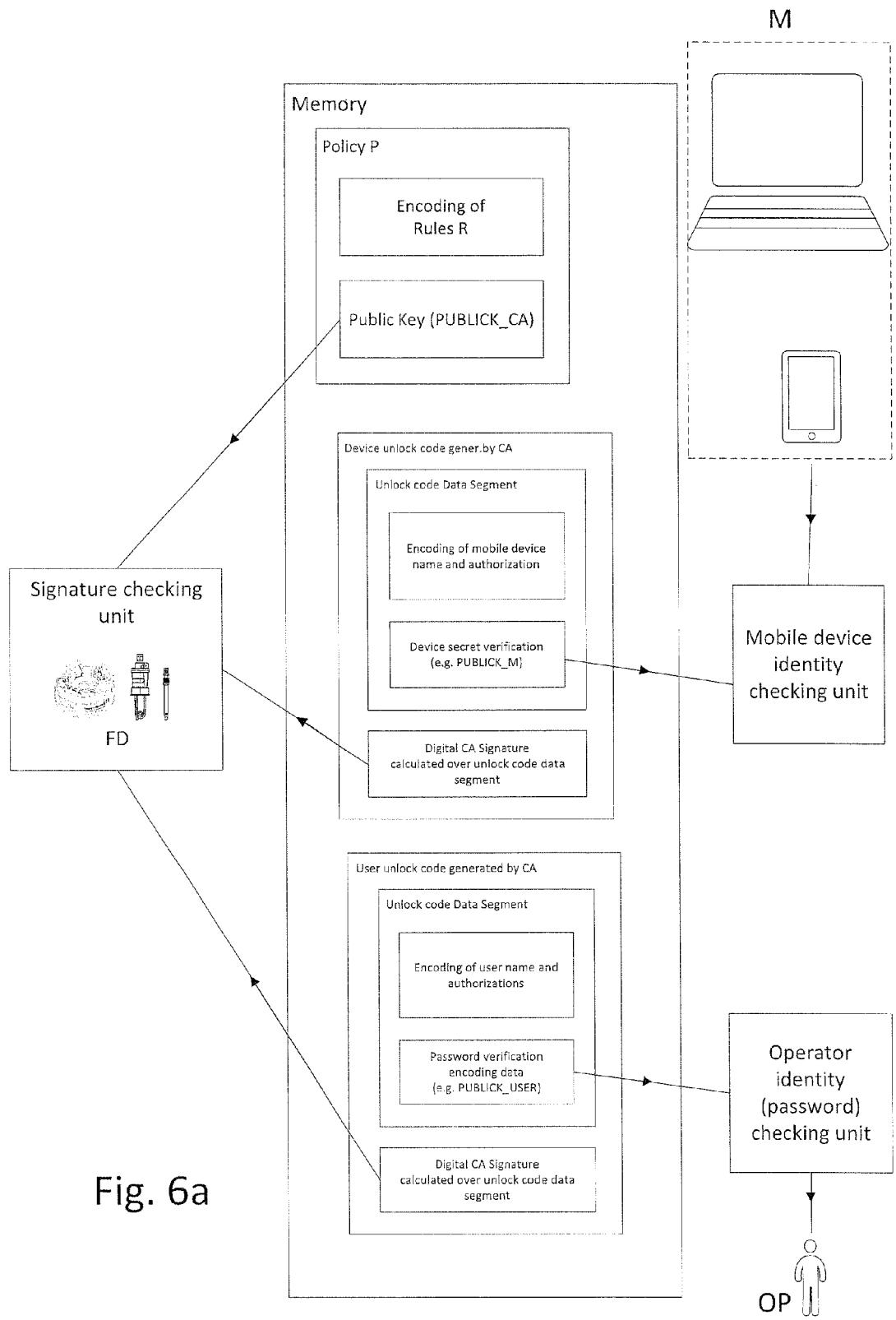
FIG. 6a and 6b show an example of an embodiment of the method according to the invention to verify the unlock keys of users and the identity of devices by field devices.
Figure 6B:
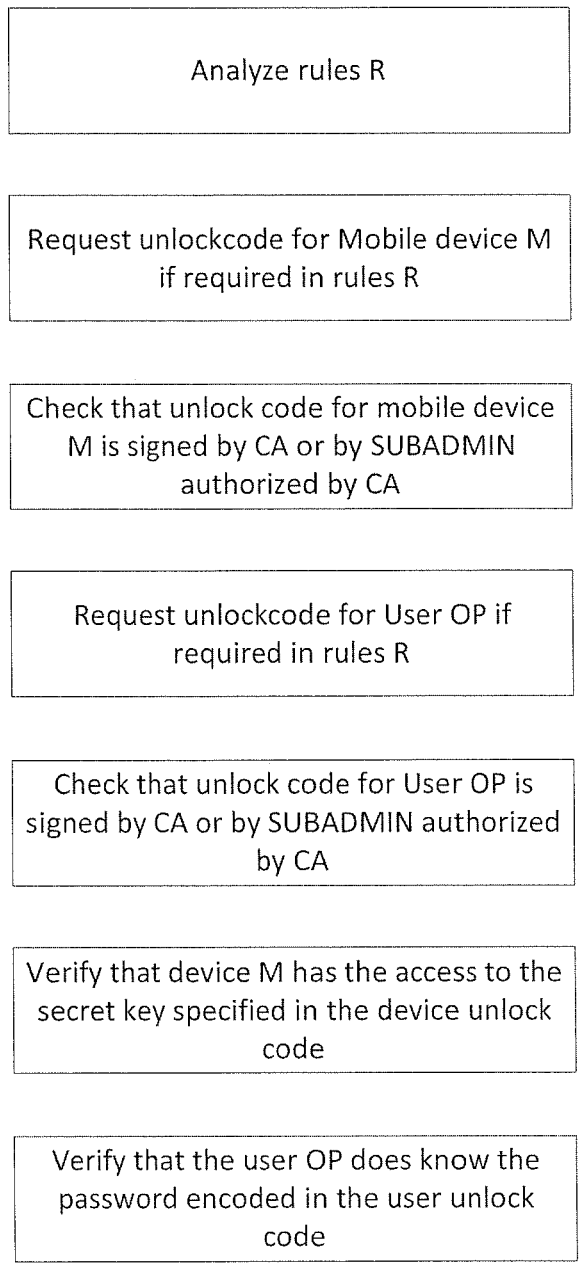

FIG. 6 shows how the authentication process proceeds on the field device FD. FIG. 6a shows the units involved while FIG. 6b shows the individual steps.

In its memory, the field device keeps the security policy P valid for plant A. The rules R to apply are found in this security policy P. Those rules R specify the unlock keys ULK and their combination to be presented by a mobile device M and/or a user OP to be granted access.

In a first step, the field device FD therefore analyses the rules R and demands the transfer of the unlock keys ULK described there from the mobile device M if necessary. If they are not transferred, the field device FD interrupts the authentication process. The same is true for the unlock codes ULK for the user OP potentially required in the rules R.

Once all necessary unlock keys ULK are transferred, the field device checks in its signature verification unit that the unlock keys ULK have been directly or indirectly signed by the plant administrator CA. If the signatures are invalid, the authentication process is interrupted with an error message.

Subsequently, the verified valid unlock keys ULK may be used to authenticate the mobile device M and the user OP. This authentication is made on the basis of information saved in the data field of the unlock key ULK, e.g. the public key of the mobile device M and/or the public key of the user OP saved there. The authentication check may be done in such a way that the field device FD generates a random number CHALLENGE and requests the mobile device and/or the user OP to sign this random number using the secret key of the mobile device M and/or the user OP.

For this purpose, the random number CHALLENGE would be transferred to the mobile device M, and the user OP, for example, be requested to enter his/her secret password via a user guidance on the display of the mobile device M. The mobile device M would execute the operations shown in FIG. 3b to determine the private key PRIVATEK_USER, calculate the digital signature via the random number CHALLENGE saved in a data field using the private key of the user PRIVATEK_USER and transfer the result of the signature to the field device FD. Authentication then may be done on the field device FD via a signature verification during which it is checked whether the signature was derived via the random number CHALLENGE saved in a data field with the private key whose respective public key has been stored in the unlock key ULK of the user in the field PUBLICK_USER.

This respective process is done for the device-related unlock key ULK, with the private key of the mobile phone not derived from a password in this case, but saved on an appropriate persistent memory medium on the mobile device M.

Figure 7:
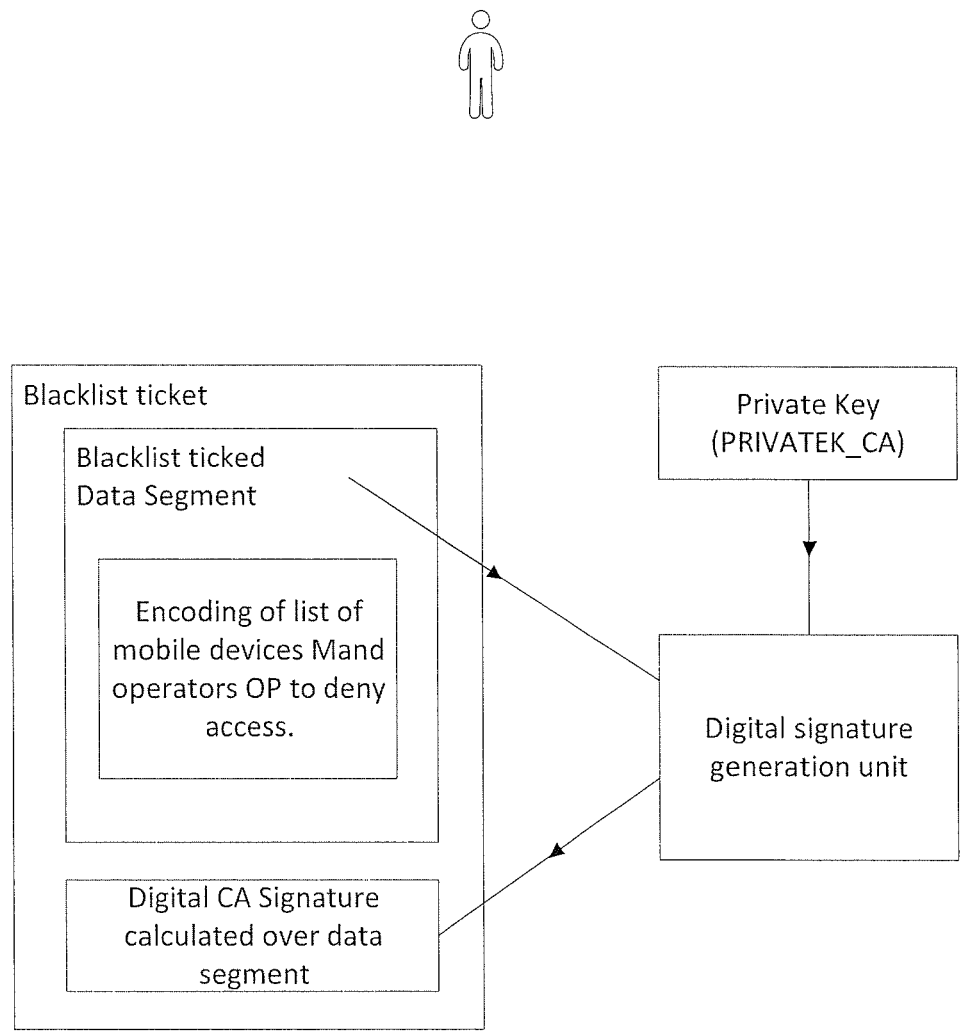
FIG. 7 shows an example of an embodiment of the method according to the invention to generate blacklist entries.

In one advantageous embodiment, the field device FD has a memory for storing block list entries (also referred to as blacklist or negative list). Checking a signature for the blacklist entries as shown in FIG. 7 may be done in the same way as for the unlock keys ULK. By making an entry is such blacklists, an administrator CA may subsequently revoke access already granted via unlock keys ULK.

FIG. 7 shows how the mechanism described for the unlock keys may also be used to sign other information, e.g. a data field DB that contains a list of the users OP to be blocked and/or their mobile devices M.

In one advantageous embodiment; plant A has at least one data base server with an up-to-date list of all valid unlock keys ULK and the currently valid blacklist. Optionally, this data base server has a service that reliably transfers the current time of day to a connected mobile device M or field device FD (e.g. as described above, secured by digital signatures).

Figure 9:
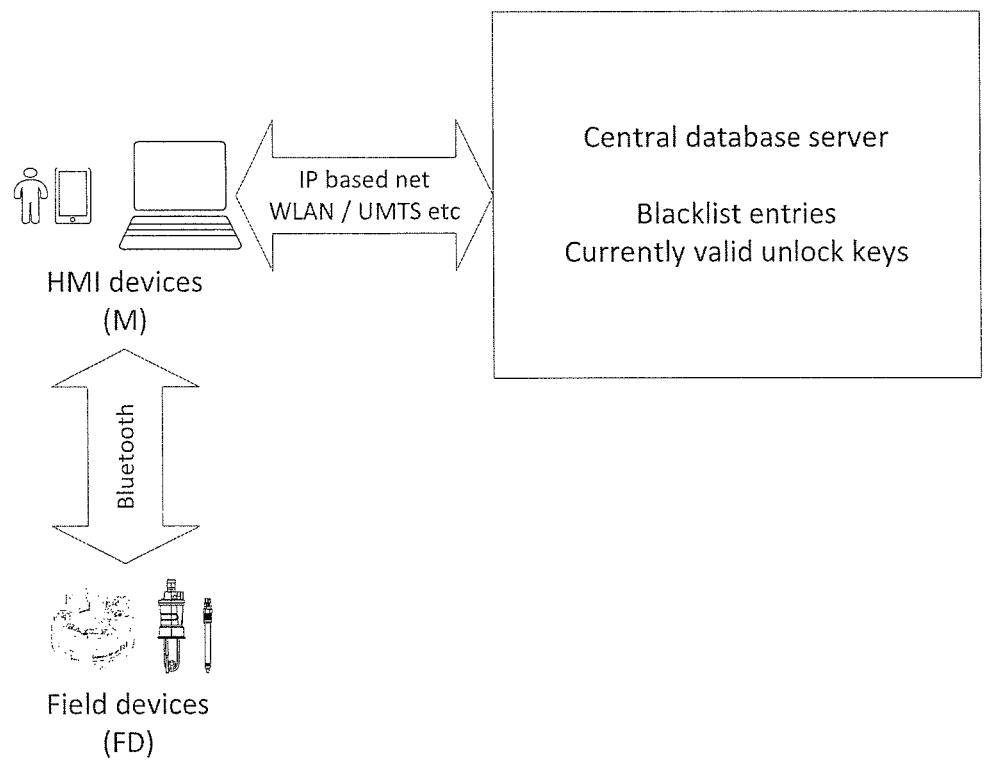
FIG. 9 shows an example of an embodiment of the invention, with the unlock keys and blacklist entries saved on a central data base server.

In one advantageous embodiment, the mobile device M has a data connection to this database server (FIG. 9). This may, for example, be done in such a way that the mobile device M on the one hand maintains a Bluetooth connection to the field device FD and at the same time maintains a connection to the data base server, e.g. via Wifi or a mobile radio standard such as UMTS.

For field devices FD that have their own direct link to Ethernet, Wifi or internet interfaces, access to the database server may also be effected directly without any involvement of the mobile device M. In this embodiment, the process of transferring unlock keys ULK as shown in FIG. 4b may be simplified, although in this case the plant operator is him/herself responsible for the administration and availability of the central data base.

In one advantageous embodiment, the field device FD has a persistent memory to save the unlock keys ULK of authorized users or mobile devices once they have successfully authenticated themselves on the field device FD. The user/mobile device is then "known" to the field device. The advantage of the local persistent memory is that should the central database server fail, authentication still remains possible at least for already "known" users and mobile devices.

The method described above to transfer information such as unlock keys ULK and therefore the authorization of a device or user on the field device is preceded by another security-relevant step in one embodiment.

In this previous step, the connection between the first device M and the second device FD is first tap-proof. In a first further development, this is also achieved via symmetric cryptography using a secret, possibly temporary, session key. To generate such a secret session key, it is advantageous to use a Diffie-Hellman key exchange method, especially using elliptic curves. Adding such an additional step is advantageous especially when radio connections are used, because in this way, the transfer of unlock keys ULK can be protected against tapping attackers.

Typically, the key used for authentication and the session key are different.

The plant A may be adjusted in such a way using the rules stored in the security policy P that once a mobile device M has been refused, a certain period of time, e.g. a minute or longer, must pass before the same mobile device M may again request access.

If a new users OP or a new mobile device M is added to plant A, or if the rights of an existing user OP or a mobile device M change, it is sufficient to generate a new unlock code ULK or modify the existing unlock code ULK. The field device FD is able to recognize independently whether the new or modified unlock key ULK and/or the respective user or mobile device is authorized to use the respective field device FD using the information already stored on the field device. It is not necessary to modify the software/firmware for each individual field device. Consequently, the entire security infrastructure is designed as a decentralized system. No central system is required. The security check is thus executed without any involvement from the control center 5. Furthermore, no central password server is required.

In one embodiment, the security policy P is additionally saved on a database server SERVER, see also FIG. 9.

A positive list and/or a negative list are preferably saved on this server SERVER and/or as part of the security policy P, with the positive list or the negative list respectively containing the authorized and/or blocked specific data of the first unit and/or the specific data or a user of the first unit. There is a data connection between the server and the mobile device M, preferably an IP-based data connection, e.g. via Wifi or UMTS. In this way, the administrator CA is able to maintain a current overview of the respective authorizations by updating the positive and/or negative list. In the same way, not every individual field device needs to be updated when a user OP is excluded or a mobile device M lost.

In such cases where the security policy P is invariable from the start, e.g. because the characteristics are obligatory and required by a standard, the expert shall also consider a case in which the set of rules is saved on the field device in another place and may be regarded as known, while the security policy exclusively consists of the unlock key verification key UCV_KEY.

For field devices with an individual operating unit (e.g. LCD and keys), experts shall also consider an embodiment in which the entries of the security policy in the field device are made in such a way that the information contained in the security policy P is entered via the local operating unit, e.g. by entering the plant administrator password or the via the keys and the key for the verification of unlock keys UCV_KEY is then calculated from this in the field device.

In one advantageous embodiment, the manufacturing sites where the field device FD is produced includes a unit that serves to program the security policy P provided by the client when placing the order into the field device ex works. This would be an advantageous way to allow the user to operate the field device FD in a secure way on their plant A from the start.

In an advantageous embodiment, an identification key is transferred at the production plant for the field device FD and/or the mobile device M that identifies the device as part of a device class, series or as a product from a trustworthy manufacturer. This may, for example, be effected via a signature with an asymmetric key set from the device manufacturer.

The advantage of such a method is that potentially sensitive information is only forwarded by the mobile device M to devices recognized as trustworthy during the authentication process. In this case, the mobile device M would transfer information such as the unlock keys ULK or blacklist only to such field devices FD that demonstrate their reliability via the manufacturer identification key.

The advantage of this method is that so-called phishing assaults by an attacker are more difficult.

The invention claimed is:

1. A method for authenticating a mobile device on a field device within a plant, in the area of process automation technology, comprising:
    establishing a wireless communication between the mobile device and the field device;
    setting up a security policy, the security policy having rules to grant to the mobile device access of the field device on the basis of at least one unlock key and having information to validate the at least one unlock key;
    provisioning the security policy on the field device;
    generating at least one unlock key for the mobile device, and providing the at least one unlock key on the mobile device;
    executing a first authentication of the mobile device from the field device, the first authentication including:
        requesting from the mobile device at least one unlock key;
        interrupting the authentication process if the mobile device does not supply the at least one unlock key;
        transferring the at least one unlock key from the mobile device to the field device;
        validating a signature on each unlock key;
        interrupting the authentication process if the signature of any unlock key is not valid;
        determining the access rights of the mobile device based on the unlock key and the rules; and
        upon successful authentication, granting to the mobile device access of the field device based on the rules.

2. The method according to claim 1, wherein the generation of the at least one unlock key is based on specific data from the mobile device, including a serial number, an international mobile equipment identity, an international mobile subscriber identity, and a phone number of data saved on a SIM card.

3. The method according to claim 1, wherein the generation of the at least one unlock key is based on specific data of a user of the mobile device, including a user name and a user password.

4. The method according to claim 2, wherein various rights on the field device being granted depend on the unlock key.

5. The method according to claim 1, wherein:
    the information to verify the unlock key being a public master key from a central administrator.

6. The method according to claim 1, wherein:
    the unlock key having a limited validity period.

7. The method according to claim 3, wherein:
    the user-specific unlock key granting the right to generate further unlock keys.

8. The method according to claim 1, wherein the security policy includes at least: a name of the plant, a master key, and information about which unlock keys in which combination grant access.

9. The method according to claim 1, wherein the provision of the at least one unlock key on the mobile device includes at least one of the following methods: SMS, e-mail, instant messaging, a 2D code, a matrix code, a QR code, a DataMatrix code, or a wireless technology including RFID and NFC.

10. The method according to claim 1, wherein:
    the security policy, additionally, being saved on a server.

11. The method according to claim 10, wherein:
    a positive list and/or a negative list being saved on the server with the positive list or the negative list respectively containing the authorized and/or blocked specific data of the mobile device and/or the specific data or a user of the mobile device.

12. The method according to claim 1, wherein:
    asymmetric cryptography with a secret private key and a respective public key being used, and the respective secret private key being required for generating an unlock key and the public key being used for verifying authentications.

13. The method according to claim 1, wherein:
    symmetric cryptography being used, which applies the same key both for the generation and the verification of unlock keys.

14. The method according to claim 1, wherein the field device is a two-wire technology field device.

15. The method according to claim 14, wherein the mobile device does not have any display.

16. The method according to claim 1, wherein:
the method being applied as a decentralized method, without the need for a central control system.

17. The method according to claim 1, wherein the wireless communication is via Bluetooth or Wi-Fi.

18. The method of claim 1, further comprising:
executing a second authentication of the mobile device from the field device, the second authentication including:
generating a random number challenge on the field device and sending the challenge to the mobile device;
signing the random number challenge on the mobile device using a private key of the mobile device or a private key of the user;
returning the signed challenge from the mobile device to the field device;
verifying on the field device the signed challenge using a public key of the mobile device or a public key of the user; and
upon verification of the signed challenge, granting to the mobile device access of the field device based on the rules.

19. The method of claim 1, wherein:
the first authentication is executed a first time using a hardware-related unlock key from the mobile device,
upon successful authentication using the hardware-related unlock key, the first authentication is executed a second time using a user-specific unlock key from the mobile device, and
upon successful authentication using the user-specific unlock key, access of the field device is granted to the mobile device based on the rules.

20. The method according to claim 1, wherein the method is embodied in a computer program product, the computer program product stored in a machine-readable computer memory placed on/in said mobile device and/or said field device.

* * * * *